United States Patent [19]

Kanao

[11] Patent Number: 5,416,270
[45] Date of Patent: May 16, 1995

[54] CLEANER HOSE WITH BUILT-IN-CONDUCTIVE WIRE

[76] Inventor: Shiro Kanao, 9-18, Nanpeidia 4-chome, Takatsuki-shi, Osaka, Japan

[21] Appl. No.: 89,516

[22] Filed: Jul. 21, 1993

[30] Foreign Application Priority Data

Jul. 22, 1992 [JP] Japan ............... 4-217304

[51] Int. Cl.6 .................... F16L 11/11; F16L 11/12
[52] U.S. Cl. ................. 174/47; 174/114 R; 138/122; 138/129
[58] Field of Search ............ 174/47, 121 A, 113 R, 174/114 R; 138/103, 121, 122, 125, 126, 129, 177, 178; 156/143, 144

[56] References Cited

U.S. PATENT DOCUMENTS

| | | | |
|---|---|---|---|
| 3,715,458 | 2/1973 | Bayes et al. | 174/113 R |
| 4,368,214 | 1/1983 | Gillette | 174/114 R X |

FOREIGN PATENT DOCUMENTS

| | | | |
|---|---|---|---|
| 0095756 | 4/1963 | Denmark | 138/122 |
| 0584196 | 4/1993 | Japan | 174/47 |
| 1310737 | 3/1973 | United Kingdom | 174/47 |

Primary Examiner—Leo P. Picard
Assistant Examiner—Hyung S. Sough
Attorney, Agent, or Firm—Sughrue, Mion, Zinn, Macpeak & Seas

[57] ABSTRACT

A cleaner hose with a built-in current conduction wire includes a reinforcing wire rod for holding strength and a conductive wire for current conduction, which are spirally wound in the inside of a hose body, and further includes a coated wire constituted by the reinforcing wire rod and the conductive wire built in the hose. The reinforcing wire rod and the conductive wire are separated at an interval and are integrally coated with a synthetic resin raw material at an interval. A coating portion of the reinforcing wire rod and a coating portion of the conductive wire are connected to each other through a thin connection portion which can be torn off, and only the coating portion of the reinforcing wire rod is connected through an adhesive to an inner surface of the hose body.

11 Claims, 3 Drawing Sheets

CLEANER HOSE WITH BUILT-IN-CONDUCTIVE WIRE

BACKGROUND OF THE INVENTION

The present invention generally relates to a dust-sucking cleaner hose for use in a vacuum cleaner, and particularly relates to a cleaner hose in which a strength-holding reinforcing wire rod and a conductive wire for current conduction are provided so as to be spirally wound in the inside of a hose body.

Conventionally, a cleaner hose of this kind has such a structure that, as generally known, a pair of coated wires, one being a steel wire acting as a reinforcing wire and the other being a conductive wire for current conduction which are integrally coated with resin, are spirally wound and a hose body is fitted onto the outer circumference of the thus spirally wound coated wires and connected through adhesive to the coated wires, so that the shape of the hose body is held by the reinforcing wire and the conductive wire is connected to a switch at hand for turning a power source of a vacuum cleaner on/off in use. Further, known is a cleaner hose having such a structure that a hose body is constituted by double layers and a coated wire constituted by a steel wire acting as a reinforcing wire and an electric wire for current conduction which are integrally coated with each other, is spirally buried between the double layers so that an electric operation is performed by using this electric wire.

In those conventionally generally known cleaner hoses, however, the steel wire and the electric wire are integrally covered with coating resin. In the case of the former hose, the whole upper surface of the coated wire is connected through an adhesive to the hose body. In the case of the latter hose, on the other hand, the coated wire is packed in between the double layers of the hose body so as to be bonded to the hose body.

Thus, when the electric wire is taken out of the hose body so as to be connected to a switch at hand or an insertion plug to a vacuum cleaner body, the separation of the coated wire from the hose body requires much trouble and the separation of the electric wire from the steel wire also requires much trouble.

That is, in the hose in either case, only a portion of the hose body is cut off and the coated wire at the end portion of the hose body is left intact by a length of the hose body necessary for taking out the electric wire. Then, the cut hose body portion is gradually separated from the coated wire portion to thereby take out the coated wire. Thereafter, the coated wire portion is cut at an intermediate portion between the steel wire and the electric wire to thereby separate the steel wire and the electric wire from each other. Then, the steel wire is cut at a position near the above-mentioned cut end portion of the hose body to thereby take out the independent coated electric wire at last.

In the conventional hoses, therefore, there is a serious problem that a long time and difficult operations are required to take out the coated electric wire. Moreover, there is an economical problem in that, since it is necessary to cut off the hose body by a length required for taking-out the electric wire at each of the opposite ends of the hose body, it is necessary to previously prepare the hose so that it is elongated enough by a length to be cut off.

SUMMARY OF THE INVENTION

The present invention has been therefore made to solve the above various problems in the conventional cleaner hoses, and has an object to provide a cleaner hose in which a coated wire comprising a reinforcing wire rod acting as a strengthening member and a conductive wire for current conduction has a special structure so that the coated electric wire can be easily torn off and separated from a coating portion of the reinforcing wire rod, and the adhesion connection between the coated wire and the hose body has a special structure so that the coated conductive wire can be easily separated from the hose body and the connection between the hose body and a switch at hand or the like can be extremely easily performed in a short time.

According to the present invention, the cleaner hose includes a coated wire comprises by a reinforcing wire rod for holding strength and a conductive wire for current conduction, which are separated at an interval and are integrally coated with a synthetic resin raw material in the inside of the hose, wherein the coated wire has such a structure that a coating portion of the reinforcing wire rod and a coating portion of the conductive wire are connected to each other through a thin connection portion which can be torn off, and only the coating portion of the reinforcing wire rod is connected through an adhesive to an inner surface of a hose body.

The thin connection portion between the respective coating portions of the reinforcing wire rod and the conductive wire may be disposed in any position, for example, in the position on the axial line side of the hose body, in the position along the inner surface of the hose body, in the intermediate position between the above-mentioned two positions, etc., so long as the connection portion can be easily separated by tearing.

In view of easiness in spiral winding of the coated wire, it is preferable that the coated wire is connected to the hose body in a laterally turned posture (that is, in such a posture that the reinforcing wire rod and the conductive wire are put side by side in the longitudinal direction of the hose body). Alternatively, the coated wire may be connected to the hose body in a standing posture, that is, in such a posture that the reinforcing wire rod is located on the hose body side and the conductive wire is located on the axial line side of the hose body.

Further, the coated wire is not limited to a wire in which a reinforcing wire rod and a conductive wire are coated as a pair, but the coated wire may be configured such that a reinforcing wire rod and two conductive wires are coated as a pair.

The present invention has such a structure as described above, that is, such a structure that the coating portion of the conductive wire is made so as to be easily torn off from the coating portion of the reinforcing wire rod and is made not to be bonded with the hose body. Therefore, the coated conductive wire can be immediately pulled out of the end portion of the hose body while being torn off and separated from the coating portion of the reinforcing wire rod, and the conductive wire thus pulled out of the hose body to the outside by the pull-out operation can be immediately connected to a required portion such as a switch at hand only through an operation to remove the coating of the pulled-out conductive wire at its end portion by a required length.

In the cleaner hose according to the present invention, therefore, it is not necessary to unnecessarily elongate the whole length of the hose but the hose may be prepared so as to have only the required length from the first, the conductive wire taking-out work can be extremely easily performed, and the connection of the conductive wire to an electric connection portion such as a switch at hand or a connection plug attached on an instrument to be connected to each of the opposite ends of the hose body can be easily performed in a short time.

DETAILED DESCRIPTION OF THE INVENTION

Referring to the accompanying drawings, preferred embodiments of the present invention will be described.

Figure 1:
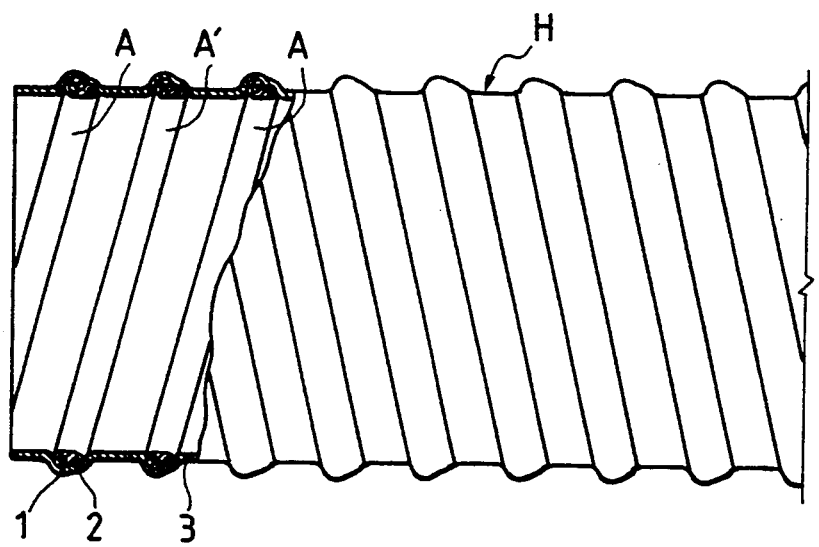
FIG. 1 is a partially broken sectional view showing a part of the outline of a hose according to a first embodiment of the present invention.
Figure 2:
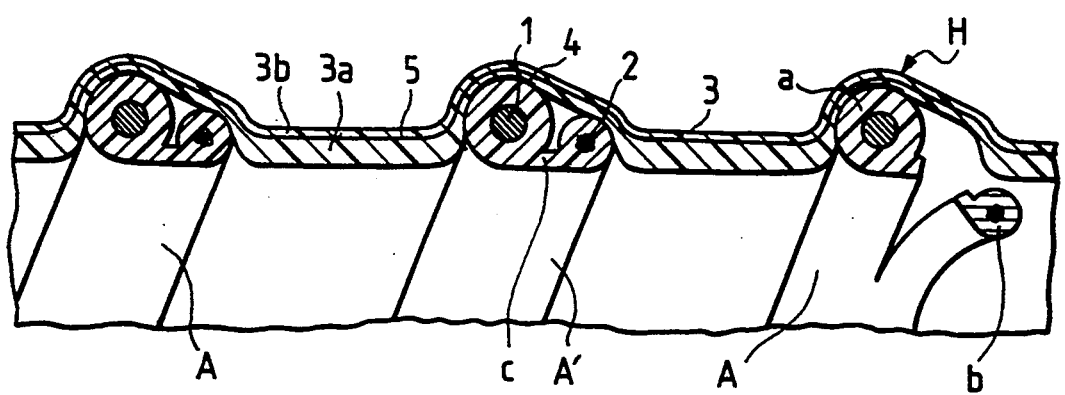
FIG. 2 is a sectional view showing a pipe wall of the hose shown in FIG. 1.
Figure 3:
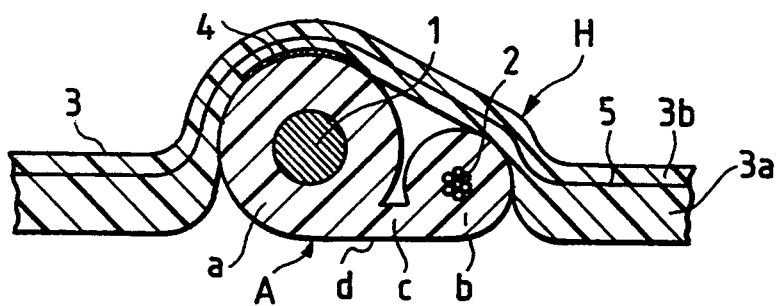
FIG. 3 is an enlarged sectional view showing the pipe wall of the hose shown in FIG. 1.
Figure 4:
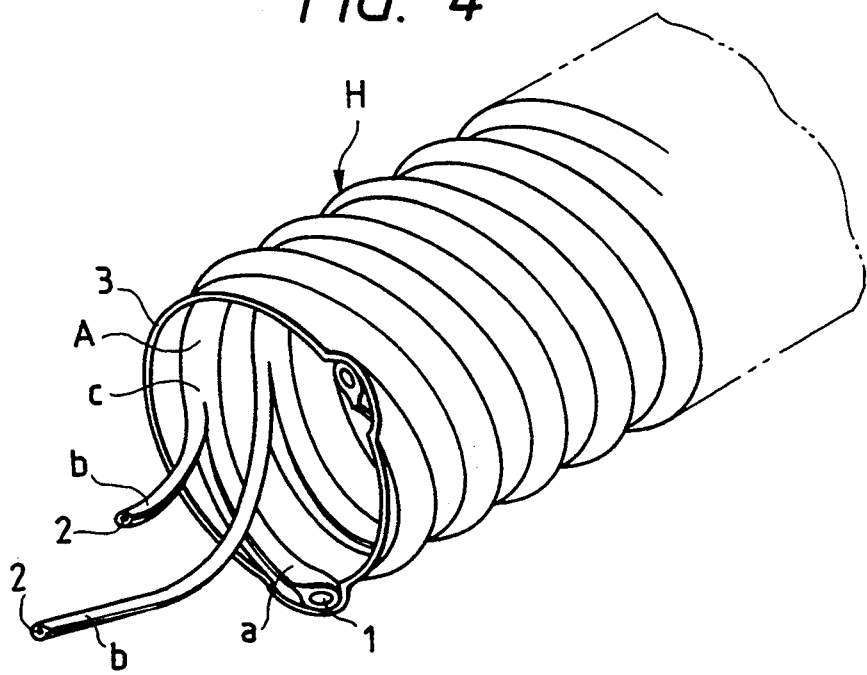
FIG. 4 is a perspective view showing a using state of the hose shown in FIG. 1.

FIGS. 1 through 4 show a first embodiment of the present invention. FIG. 1 shows a partially broken exterior shape of a cleaner hose H, FIG. 2 is an enlarged view showing the structure of a pipe wall portion, FIG. 3 is an explanatory view showing a further enlarged portion of FIG. 2, and FIG. 4 is a view showing a state where a conductive wire is taken out.

A coated wire A shown in the drawings of this embodiment has a structure in which a reinforcing wire rod 1 formed by using a steel wire rod and a conductive wire 2 formed by bundling-up a large number of thin copper wires are circularly coated with a polyvinyl chloride raw material so that the section is formed into like "glasses" and that the reinforcing wire rod 1 and the conductive wire 2 are separated at a small interval from each other but integrally connected to each other through a thin connection portion c at a one-sided position so that an outside line d between the reinforcing wire rod 1 and the conductive wire 2 is made substantially linear.

Further, the hose H of this embodiment has such a structure as follows. That is, a pair of such coated wires A and A' with a required interval are spirally wound in parallel with the respective connection portions c put downside. After an adhesive 4 is applied only to an upper surface of a coating portion a of each of the reinforcing wire rods 1, a belt-like raw material of polyvinyl chloride for forming a hose wall is wound so as to extend over the outer peripheral surface of the coated wire A or A' and the gap portion between the coated wires A and A', and adjacent portions of the belt-like raw material are connected to each other so that a hose body 3 is formed and at the same time the belt-like raw material is connected to the coated wires A and A' by the adhesive 4.

Further, in the hose H, the belt-like raw material is partially thicken and each of the thus formed thicker portions is disposed in the gap between the coated wires A and A', so that the hose wall thicker than the upper surface portion of each of the coated wires A and A' is formed in the gap between the coated wires A and A' and that the inner surface of the hose wall disposed in each gap between the coated wires A and A' and the outside line d (the lower surface portion) of each of the coated wires A and A' are made to be substantially even to each other.

In a hose body 3 shown in FIG. 3, the hose wall has a structure of a two-layered wall constituted by inner and outer layers 3a and 3b. Reference numeral 5 designates a boundary between the inner and outer layers and simultaneously designates a reinforcing thread interposed in the longitudinal direction of the hose between the outer and inner layers. The hose H according to the present invention can be realized as a hose having a hose wall constituted by two layers as described above and as a hose in which, besides the reinforcing thread, any reinforcing member such as a fibrous reinforcing member or a mesh-like reinforcing member is interposed between two layers.

For the sake of easily grasping the size of the hose H in this embodiment, the dimensions of the various portions shown in the drawings of this embodiment will be roughly described in the following example. The diameter of the reinforcing wire rod 1 is 1.0 mm, the diameter of the coating portion a of the reinforcing wire rod 1 is 2.35 mm, the conductive wire 2 is constituted by 7 wires each having a diameter of 0.18 mm, the diameter of the coating portion b of the conductive wire 2 is 1.45 mm, the thickness of the connection portion c is 0.45 mm, the distance between the respective center lines of the reinforcing wire rod 1 and the conductive wire 2 is 2.00 mm, the distance between the respective center lines of the reinforcing wire rods 1 and 1 is 10.0 mm, the thickness of the hose body inner layer 3a at its portion covering the coated wire A in FIG. 3 is 0.35 mm, the thickness of the hose body inner layer 3a at its portion between the coated wires A and A' in FIG. 3 is 0.70 mm, the thickness of the hose body outer layer 3b in FIG. 3 is 0.25 mm, and the inner and outer diameters of the hose body 3 are 37.5 mm and 44.0 mm respectively.

In the thus formed cleaner hose, the conductive wire 2 with the coating portion b can be immediately pulled out of the hose body 3 from the end portion of the hose body 3 while being torn off and separated from the coating portion a of the reinforcing wire rod 1, as shown in FIG. 4. Therefore, the conductive wire 2 pulled out of the hose body 3 to the outside by the pull-out operation as described above can be immediately connected to a required portion such as a switch at hand through only such an ordinary operation that the coating d of the end portion of the conductive wire 2 is removed by a required length.

Further, in the hose shown in this embodiment, the portion between the coated wires A and A is formed to have a thicker wall portion so that the hose can be used without such an inconvenience that the hose shrinks by a suction operation in use. Moreover, the hose has an advantage in that it can be easily used because of its light weight in comparison with a hose in which the whole hose body is formed to have a thick wall.

Figure 5:
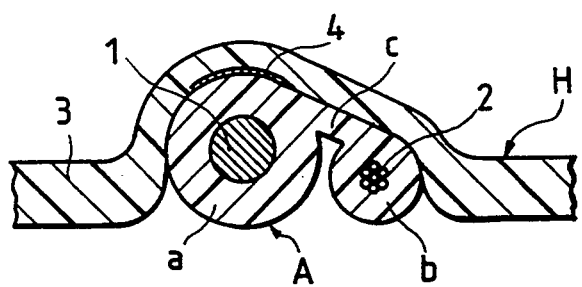
FIG. 5 is an enlarged sectional view showing a pipe wall portion of a hose of a second embodiment.
Figure 6:
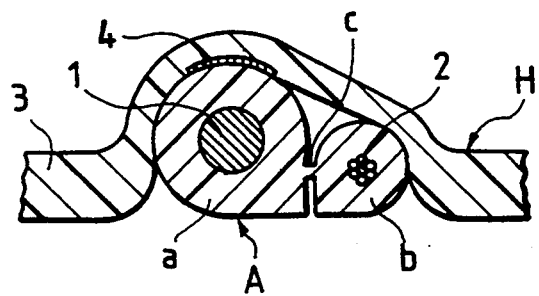
FIG. 6 is an enlarged sectional view showing a pipe wall portion of a hose of a third embodiment.
Figure 7:
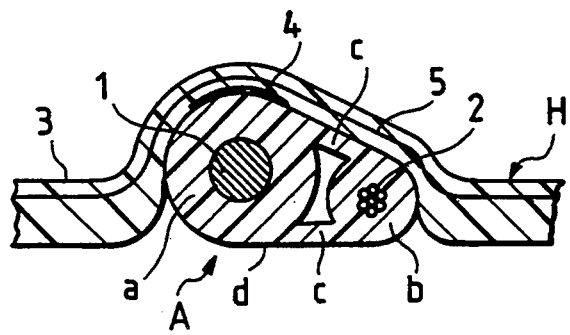
FIG. 7 is an enlarged sectional view showing a pipe wall portion of a hose of a fourth embodiment.

FIGS. 5 through 7 show other embodiments of the coated wire A. In a second embodiment shown in FIG. 5, a coated wire A having the same sectional shape as that shown in the above-mentioned first embodiment is disposed upside down to the case of the first embodiment so that a thin connection portion c is placed at the outer peripheral surface side. Adhesion to a hose body 3 is made in a manner so that only the upper surface of a coating portion a of a reinforcing wire rod 1 is made to adhere to the hose body 3 through an adhesive 4 in the same manner as in the first embodiment.

In a third embodiment shown in FIG. 6, a thin connection portion c of a coated wire A is formed at an intermediate portion in the up/down direction in the drawing between a coating portion a of a reinforcing wire rod 1 and a coating portion b of a conductive wire 2. In a fourth embodiment of FIG. 7, a thin connection portion c of a coated wire A is formed at each of upper and lower portions in the drawing between a coating portion a of a reinforcing wire rod 1 and a coating portion b of a conductive wire 2 so that a hollow portion is formed at an intermediate portion between the connection portions c. Portions other than the above-mentioned portions are the same as those in the first embodiment.

Figure 8:
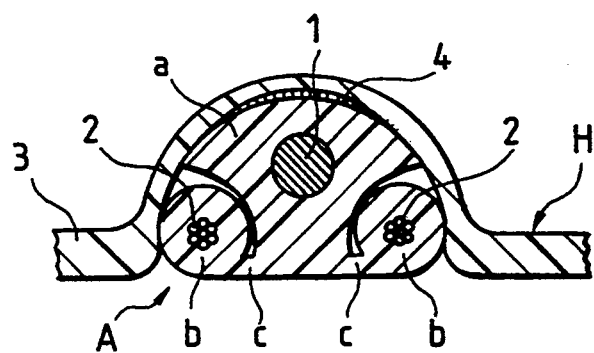
FIG. 8 is an enlarged sectional view showing a pipe wall portion of a hose of a fifth embodiment.

Although the coated wire A in each of the foregoing embodiments is formed by coating a reinforcing wire rod 1 and a conductive wire 2 as a pair, a fifth embodiment shown in FIG. 8 shows a coated wire A in which a reinforcing wire rod and two conductive wires are coated as a pair. In this embodiment of FIG. 8, in a coated wire A having the same sectional shape as that shown in the first embodiment, another conductive wire 2 is additionally provided so that the two conductive wires 2 are disposed symmetrically with respect to the reinforcing wire rod 1 on the right/left sides thereof. Also in this case, the adhesion to a hose body 3 is made in a manner so that only an upper surface of a coating portion a of the reinforcing wire rod 1 is made to adhere to the hose body 3 through an adhesive 4 in the same manner as in the first embodiment.

Figure 9A:
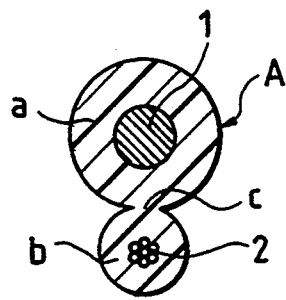
FIG. 9(a) is an enlarged sectional view showing a coated wire having one conductive wire of a sixth embodiment.
Figure 9B:
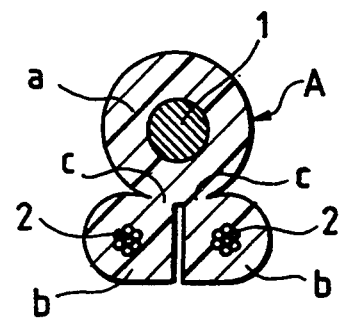
FIG. 9(b) is an enlarged sectional view showing a coated wire having two conductive wires of a seventh embodiment.

Embodiments shown in FIG. 9 show a coated wire A in which a reinforcing wire rod 1 and a conductive wire 2 are vertically disposed. FIG. 9(a) shows the structure of the coated wire A in which a reinforcing wire rod 1 is located at the hose body 3 side and a conductive wire 2 is located at the axial line side of the hose body 3, and FIG. 9(b) shows the structure of the coated wire A in which two conductive wire 2 and 2 are located below a reinforcing wire rod 1 and right and left sides respectively. The coated wire A according to the present invention may be realized in such a structure.

In the case of the coated wire A in which a reinforcing wire rod 1 and two conductive wire 2 are coated as a pair as shown in the embodiments of FIG. 8 and FIG. 9(b), even a hose in which only one coated wire A is wound on the hose body 3 can be used for operating a switch at hand or the like. Further, in such a hose in which two coated wires A are wound, one of the coated wires A can be used for a switch at hand for turning the cleaner body per se on/off while the other coated wire A can be used for turning a suction portion set rotary body provided at a front end of an operation pipe.

Although description has been made as to the embodiments which are considered to be representative of the present invention, the present invention is not limited to the structures of those embodiments. The present invention may be suitably modified and carried out within a scope in which the foregoing constituent features of the present invention are provided and the objects of the present invention are attained, and effects which will be described later are obtained.

As apparent from the foregoing description, according to the present invention, the coated wire has such a structure that the respective coating portions of the reinforcing wire rod and conductive wire are connected to each other through the thin connection portion which can be torn off, and the adhesion connection between the coated wire and the hose body has such a structure that only the coating portion of the reinforcing wire rod is connected through adhesive to the inner surface of the hose body so that the coating portion of the conductive wire is easily torn off from the coating portion of the reinforcing wire rod and the coating portion of the conductive wire does not adhere to the hose body. It has therefore been obtained such a remarkable effect that the coated conductive wire can be immediately pulled out of the hose body from its end portion while being torn off and separated from the coating portion of the reinforcing wire rod and the conductive wire pulled out of the hose body to the outside by the pull-out operation as described above can be immediately connected to a required portion such as a switch at hand through only such an operation that the coating portion of the pulled-out conductive wire is peeled at its end portion by a length required for connection.

Further, in the hose according to the present invention, it is not necessary to make the whole length of the hose longer by a length required for removing the conductive wire, and therefore the hose can be made so as to have a length required for normal use. Conductive wire removal operations can be performed extremely easily, and connection of the conductive wire to an electric connection portion such as a switch at hand or a connection plug attached on the devices to be connected to the opposite ends of the hose body can be easily performed in an extremely short time. Therefore, the production cost of the unit can be greatly reduced.

What is claimed is:

1. A cleaner hose with a built-in current conduction wire, comprising:
   a hose body comprising an outer wall of said hose;
   a reinforcing wire rod for improving holding strength of said hose, said reinforcing wire rod being provided so as to be spirally wound inside said hose body;
   a conductive wire for current conduction, said conductive wire being provided so as to be spirally wound inside said hose body;
   a first coating portion of a synthetic resin raw material covering said reinforcing wire rod;
   a second coating portion of said synthetic resin raw material covering said conductive wire;
   an adhesive for bonding only said first coating portion to an inner surface of said hose body; and
   a thin connection portion of said synthetic resin raw material for connecting said first coating portion to said second coating portion, said thin connection portion being made so thin that it can be torn off.

2. A cleaner hose as claimed in claim 1, wherein said hose body includes an outer layer, an inner layer, and a reinforcing member provided between said inner and outer layers.

3. A cleaner hose as claimed in claim 1, wherein a space is provided between an inner surface of said hose body and said thin connection portion.

4. A cleaner hose as claimed in claim 1, wherein a wall thickness of said hose body at positions adjacent to said first coating portion, said second coating portion, and said thin connection portion of said hose is made substantially thinner than that at other positions of said hose.

5. A cleaner hose as claimed in claim 1, wherein said thin connection portion is provided so as to contact with an inner surface of said hose body.

6. A cleaner hose as claimed in claim 1, wherein said thin connection portion is provided at an intermediate position of each of said first and second coating portions.

7. A cleaner hose as claimed in claim 1, wherein a space is provided in said thin connection portion.

8. A cleaner hose as claimed in claim 1, further comprising another conductive wire, another coating portion covering said another conductive wire, and another thin connection portion for connecting said another coating portion to said first coating portion.

9. A cleaner hose as claimed in claim 1, wherein said conductive wire is disposed alongside said reinforcing wire rod.

10. A cleaner hose as claimed in claim 1, wherein said conductive wire is disposed at an axial line side of said hose body and said reinforcing wire rod is disposed at a hose body side.

11. A cleaner hose as claimed in claim 1, wherein said hose body includes a plurality of layers, and a wall thickness of at least one of said layers of said hose body at positions adjacent to said first coating portion, said second coating portion, and said thin connection portion of said hose is made substantially thinner than that at other positions of said hose.

* * * * *